March 30, 1937. H. W. ALDEN 2,075,563
STEERING WHEEL DRIVE FOR VEHICLES
Filed Sept. 25, 1934 4 Sheets-Sheet 1

Inventor
Herbert W. Alden

Strauch & Hoffman
Attorneys

March 30, 1937.  H. W. ALDEN  2,075,563
STEERING WHEEL DRIVE FOR VEHICLES
Filed Sept. 25, 1934  4 Sheets-Sheet 2
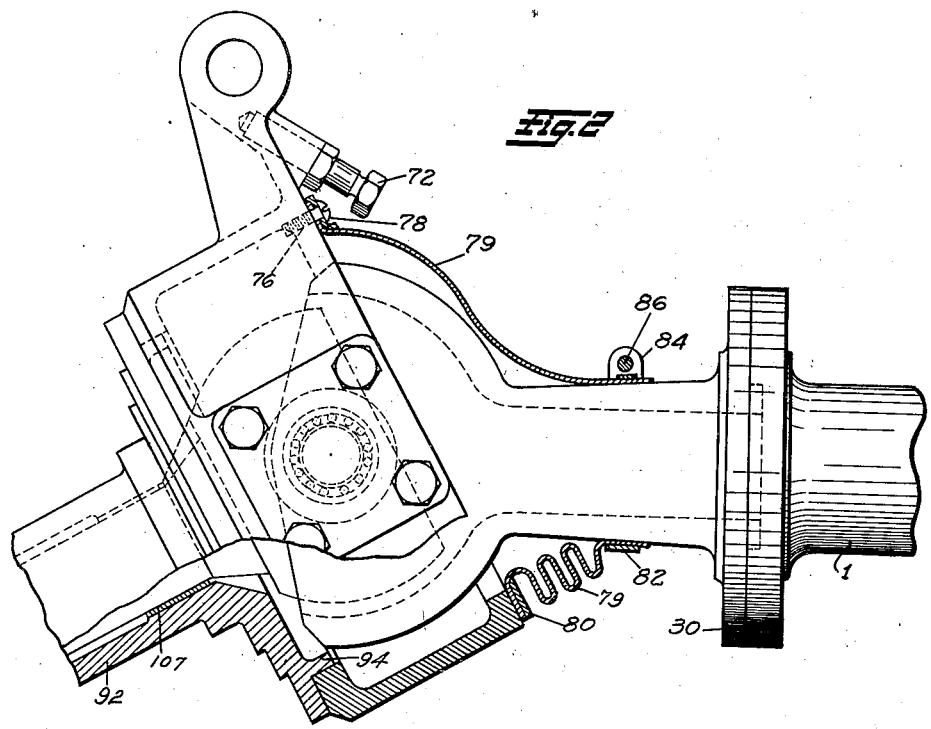
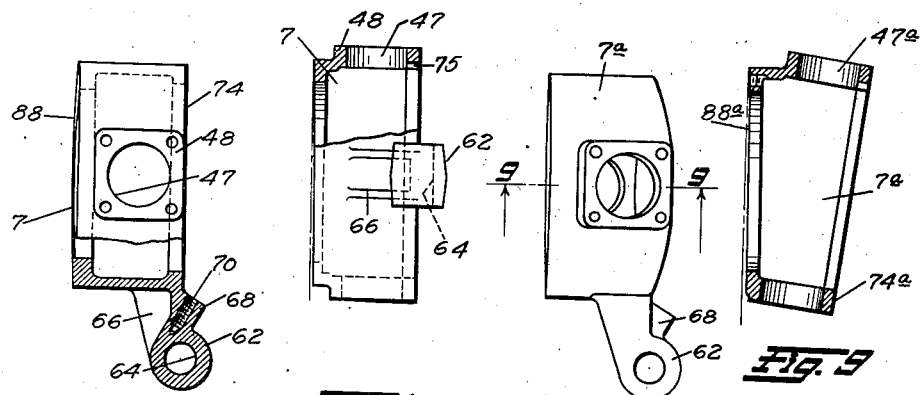
Inventor
Herbert W. Alden
By Strauch & Hoffman
Attorney

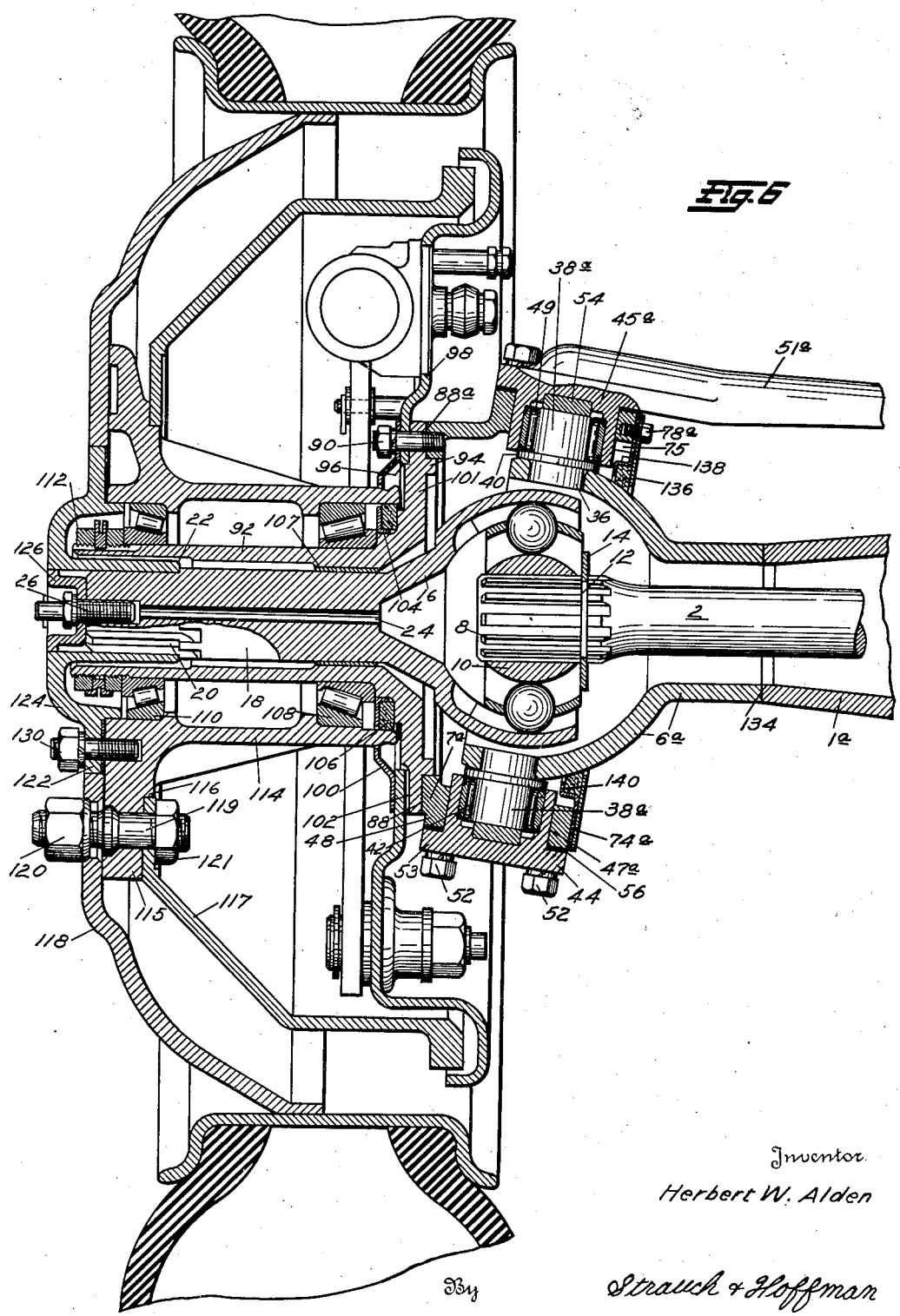

March 30, 1937.  H. W. ALDEN  2,075,563
STEERING WHEEL DRIVE FOR VEHICLES
Filed Sept. 25, 1934   4 Sheets-Sheet 4

Inventor
Herbert W. Alden

By
Strauch & Hoffman
Attorney

Patented Mar. 30, 1937

2,075,563

UNITED STATES PATENT OFFICE 2,075,563

STEERING WHEEL DRIVE FOR VEHICLES

Herbert W. Alden, Detroit, Mich., assignor to The Timken-Detroit Axle Company, Detroit, Mich., a corporation of Ohio Application September 25, 1934, Serial No. 745,482

13 Claims. (Cl. 180—43)

This invention relates to wheel mountings for vehicles, and more particularly to a mounting for driven wheels and flexible driving connections permitting dirigibility of the wheels.

Devices of this character are ordinarily provided with a flexible driving connection in the form of a universal joint which is placed so that its center of rotation coincides with the intersection of the centerline of the axle spindle and the centerline of the wheel pivot. It is necessary that the driving connection be enclosed in order to insure the retention of lubricant and exclusion of dirt and grit, during operation. The enclosure for the flexible driving connection ordinarily consists of two socket members connected by a swivel joint to permit steering movement of one of these members, which is attached to the driven steering wheel of the vehicle, with respect to the other member which is attached to a load carrying member of the vehicle such as an axle housing or the like. The trunnions of the swivel joint about which the driven wheels turn for steering movement are preferably mounted on the inner socket member and project into the outer socket member. The bearings for the trunnions are ordinarily mounted on the outer socket member and as the trunnion bearings are subjected to heavy loads it has heretofore been necessary to make them extremely large. One of the socket members in this usual type of construction is ordinarily contained within the other and the outer socket overlaps the inner socket. The inner member ordinarily has an external spherical surface so that a seal can be attached to the overlapping portion of the outer member to ride upon said spherical surface of said inner member.

With the large trunnion bearings used in prior art devices of the type with which this invention is concerned, the overlapping part of the outer socket member necessarily extended somewhat beyond the center of the trunnion bearings, and in an effort to reduce the size and weight of the parts it has been the practice as shown by the prior art to construct the outer socket member so that the overlapping portion thereof will register as closely as possible with the outer spherical surface of the inner socket member. As a result of this prior art practice, the internal diameter of the overlapping portion of the outer socket member is less than the diameter of the inner socket member. To provide for assembly and disassembly of these socket members presents a difficult problem for solution. The problem is further complicated because of the desirability of mounting of the trunnions on the inner socket member.

A specific difficulty in assembling and disassembling such devices constructed in accordance with the practices of the prior art has been the necessity for assembling the overlapping part of the outer socket member over the inner socket member from the side of the latter which is overlapped. This step in assembling the members must be performed before the inner member is attached to the load carrying member of the vehicle. A permanent connection between the inner member and the load carrying member of the vehicle cannot be employed because such a connection would prevent removal of the outer socket member from the inner member and the vehicle load carrying member.

In prior art designs the problem presented by the use of large bearings and the reduced diameter of the overlapping part of the outer socket member has been solved by resorting to special constructions of relatively complicated design involving expensive machining operations. One common solution found in the prior art is to make the outer socket member in two parts, bolted together in the plane of the wheel pivot centerline. Even with this construction, assembly and disassembly is extremely difficult, for the piece forming the overlapping part of the outer socket member must be assembled on to the inner socket member from the side of the inner member which it is to overlap. It is still necessary for the reason pointed out above to have the inner socket member removable from the vehicle load carrying member. This means that in service the entire universal joint mechanism as well as the inner socket member, must be disassembled before the overlapping part of the outer socket member can be removed.

A further disadvantage of the special constructions of such design is the possibility of the bolts, which clamp together the two parts of the outer member, becoming loosened. Also, making the outer socket member of two pieces is extremely expensive as the mating faces must have mating grooves to insure concentricity which necessitates extremely accurate machining. Further, the weight of such parts is relatively high, as the mating flanges must be fairly rugged.

The present invention contemplates the use of smaller trunnion bearings of the type known as "cageless roller bearings" which for a given size have a much larger carrying capacity than bearings used in devices of the prior art. By using the smaller cageless roller bearings, the size and overlap of the outer socket member is materially reduced making it unnecessary to have the internal diameter of the overlapping part so small that it will not pass over the inner socket member which eliminates the necessity for making the outer socket member in two parts.

It is, therefore, one of the principal objects of this invention to provide a design for driven steering wheels of vehicles having a one-piece outer socket member.

Another object of the present invention is to provide a mounting for driven vehicle steering in which the pivotal connection between the members of the mounting comprises relatively small cageless roll bearings whereby the size and weight of the parts carrying the wheel are materially reduced.

A further object is to provide a one-piece outer socket member whereby machining costs and unsprung weight of the vehicle are greatly reduced.

A further object is to provide a one-piece outer socket member that will greatly facilitate assembly and disassembly.

A further object is to provide a combination with a one-piece outer socket member, trunnion bearings of the cageless roller bearing type whereby size and weight of the parts are decreased and assembly and disassembly facilitated.

A further object is to provide an outer socket member so designed that the driven wheel will have the proper camber.

A further object is to provide in combination with a one-piece outer socket member, means associated with said outer member and the inner socket member for sealing lubricant within said members.

More specifically, it is a further object to provide an oil sealing means for the inner and outer socket members which does not require machining for its use and which eliminates the use of retaining screws.

Another specific object is to provide an oil sealing means for such a device which may be clamped to each socket member and yet requires no smoothly finished contacting surface on the inner socket member.

A further and major disadvantage attending the use of the two-piece outer socket member in prior designs is the necessity for bolting the inner socket member to the load-carrying member or axle housing as pointed out above, in order that the overlapping part of the outer socket may be removed in service. It is obvious that such an arrangement necessitates the provision of bolting flanges at the outer ends of the load-carrying member and at the end opposite to the spherical portion of the inner socket member. Also, the size of such bolting flanges is limited by the smallest inside diameter of the over-lapping part of the outer socket. Such limitation governs the strength of the bolted joints obtainable. As stated before in connection with the two-piece outer socket member, there is the possibility of the bolts, which clamp together the flanges, becoming loosened and also, accurate machining is required, which is expensive.

Further, as in the case of the two-piece outer socket, due to the size limitation, the flanges must be made quite thick, which adds considerable weight.

By using a one-piece outer socket member, which can be assembled over the outer spherical surface of the inner socket member from the side opposite the connection of the inner member to the vehicle load carrying member, it is possible to eliminate such bolting flanges by forming the hub of the inner socket member integral with the load-carrying member or permanently securing it to the load carrying member as by welding. The adjacent portions of the inner socket member and the load-carrying member which may be butt-welded together, if desired, are of relatively small section and ordinarily of the same size as the remainder of the sleeve-like portions of the load-carrying member.

Therefore, a further principal object of this invention is to provide a design for driven steering wheels of vehicles wherein the number of mechanical joints is reduced to a minimum.

A further object is to provide an inner socket member which is rigidly secured to the load-carrying member.

A still further object is to provide an inner socket member and load-carrying member joint which reduces the unsprung weight.

The elimination of the flange also eliminates some of the difficulties of manufacture. With the flange present it has been necessary to forge or cast the inner socket member. The design of said member is simplified to such an extent by the elimination of the flange that it may be made from a stamping. The advantages—such as initial low cost, elimination of machining operations and reduction in weight—of a stamping over a forging or casting are well known.

Therefore, a further object is to provide an inner socket member for a driven steering wheel design that is simple in design, inexpensive to manufacture and requires a minimum of machining operations.

These and various other objects of this invention will be apparent from the following description and appended claims when taken in connection with the accompanying drawings wherein:

Figure 2 is a view in partial section looking upwardly from the bottom of Figure 1, but less the wheel, hub and other parts for the sake of clarity, and illustrates the relationship of the parts when the wheel is turned at an angle.

Figure 3 is a detail plan view partly in section of the outer socket member of Figure 1.

Figure 4 is a front elevational view in partial section of Figure 3.

Figure 6 is a view similar to Figure 1 and illustrates a modified form of this invention.

Figure 8 is a detail plan view of the outer socket member of Figure 6.

Figure 9 is a section taken on the line 9—9 of Figure 8.

Figure 1:
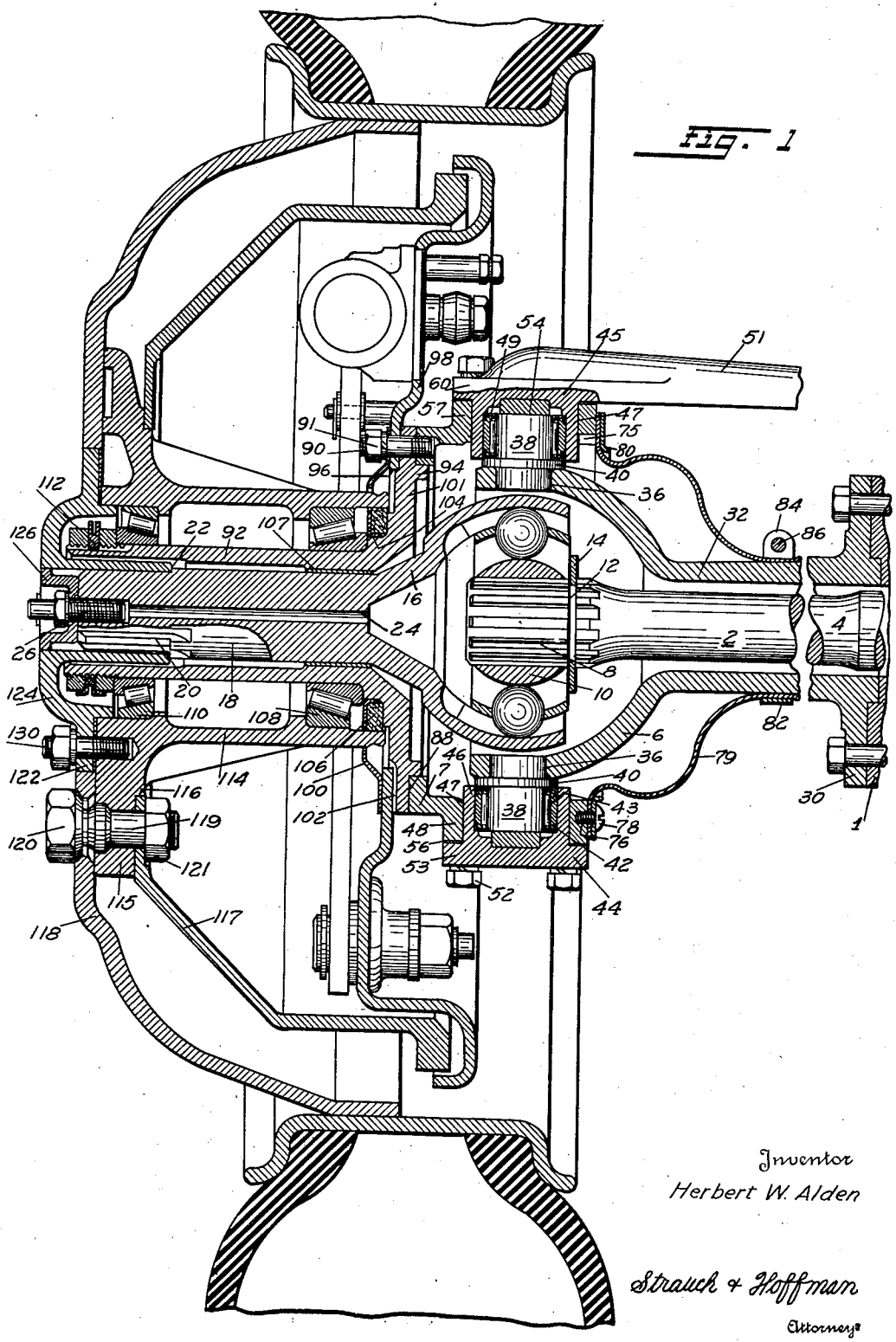
Figure 1 is a vertical sectional view of a driven steering wheel embodying one form of this invention.

Referring now to the drawings wherein like parts are designated by the same reference characters wherever they occur, and with particular reference to Figure 1, an axle housing 1 is supported in any suitable manner on the vehicle and is adapted to support a drive axle 2, which is driven by the engine of the vehicle in any suitable manner. The drive axle 2 has a slightly enlarged portion 4 which is adapted to register with a sealing device (not shown) in the housing to prevent the escape of lubricant from the universal joint housing, the structure of which is a major feature of my present invention and will be described in full detail hereinafter. This housing comprises two major parts, an inner casing or socket member 6, and an outer socket member 7, the latter being substantially cylindrical in form as shown by Figures 3 and 4. At its outer end the axle 2 has spline teeth 8 which are removably connected to the inner member 10 of the universal joint. Adjacent the inner end of said splines 8 is a peripheral groove 12 which is adapted to receive a split-snap washer 14 which abuts inner member 10 of the universal joint. Said split-snap washer 14 restricts inward travel of the universal joint on the drive axle 4.

The particular design of universal joint is not important as any joint having the required dimensions is usable, although the type wherein constant rotational velocity of the driven member is obtained, is preferable. Such a universal joint is disclosed. The outer or driven member 16 of the universal joint has a shaft portion 18 integral therewith, which has a spline 20 on its outer end for operative driving engagement with the vehicle wheel in a manner to be described. The diameter of the portion of spline 20 adjacent its outer end is less than the diameter of the inner portion of spline 20, the latter being of substantially the same diameter as the shaft portion 18. Said smaller diameter changes abruptly to the larger diameter at shoulder 22. The purpose of the spline 20 and the shoulder 22 will be evident hereinafter.

Passing centrally through the shaft portion 18 is an aperture 24 which communicates at its outer end with a threaded bore adapted to receive a suitable lubrication fitting 26. The lubricant for the universal joint is forced through the fitting 26 to the aperture 24 and thence into the universal joint chamber.

Where it is desirable in view of operating considerations to have the universal joint socket member 6 separable from the vehicle axle housing 1, a flange 30 is formed on one end of the universal joint socket member 6 in abutting relationship with the outer flange of the axle housing 1. As the description of the invention proceeds it will become clear that the socket member 6 may be integrally joined to the axle housing 1, an arrangement which is made possible by the present invention and is one of the major features thereof. The opposite end of socket member 6 is formed as a hollow spherical casing and partly surrounds the universal joint. Flange 30 and the spherical casing portion are joined by a sleeve-like portion 32 of reduced diameter.

Socket member 6 is provided with oppositely spaced openings 36 for the insertion of trunnions 38 which pivotally carry the outer socket member 7. Said trunnions are rigidly secured in the openings 36 by suitable means, such as a press-fit, and extend outwardly with respect to the socket member 6. The trunnions 38 are provided with annular shoulders 40 which abut the member 6, and thus fix their relationship thereto. A cylindrical portion of each trunnion extends beyond the shoulder 40 and is adapted to pilot or to become an inner race for trunnion bearings 42 which, to secure the full benefits of my invention, are known as cageless roller bearings. This type of bearing for a given size has a greater load capacity than others heretofore used in flexible drive wheel mountings. Bearings 42 are carried in the outer races 43 which are seated in trunnion caps 44 and 45 and may be secured therein in any suitable manner; for example, by a press-fit.

The bearing rollers 42 may be restrained against longitudinal movement by small inwardly directed flanges at both ends of each race 43, or by means of sheet metal caps 49 fitting over the ends of each race, the said caps having flanges which project over the ends of the cylindrical bearing surfaces of the race. Cylindrical portions 46 of the trunnion caps are received in openings 47 in two oppositely spaced bosses 48 on the outer socket member 7. Because of the compact form of bearing which is used, the openings 47 and the surrounding bosses are relatively small and therefore the outer socket member 7 can be of relatively light construction.

Trunnion caps 44 and 45 are identical in structure with the exception that cap 45 has an arm extension 51 integral therewith, which is adapted to carry a steering ball member (not shown). Said caps 44 and 45 are removably secured to outer socket member 7 by any suitable means, such as cap screws 52 received in suitable apertures in flanges 53 of the trunnion caps 44 and 45.

Shims 56 are provided between the flanges 53 of caps 44 and 45 and the flat surfaces of the bosses 48 on the outer housing member 7 for the purpose of positioning the inner socket member 6 in correct relation to outer socket member 7.

Hardened circular thrust washers 54 are inserted into a central recess provided therefor in caps 44 and 45 and abut the outer ends of trunnions 38. Washers 54 are, as their name implies, for the purpose of absorbing vertical thrust.

Figure 5:
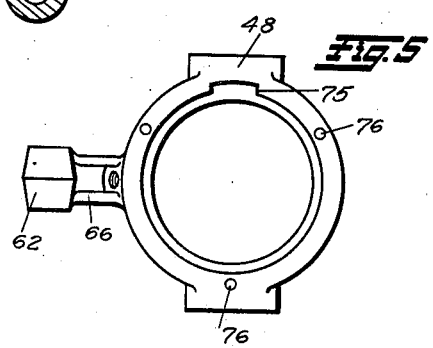
Figure 5 is an end elevational view of Figure 3.

Referring for the moment to Figures 3, 4 and 5, a vertical boss 62 having a central aperture 64 therethrough is positioned outwardly from the periphery of the cylindrical surface of member 7 and is attached thereto by means of suitable walls and ribs 66. Said boss 62 is spaced equally between bosses 48. Aperture 64 is adapted to receive suitable mechanism for linking the two steering wheels of the vehicle together so that turning of one wheel will react to turn the other. Adjacent boss 62 and formed in the supporting wall thereof is a second boss 68 which contains a threaded aperture 70. This aperture 70 is on the horizontal centerline and at an angle to the end surface 74 of member 7. The aperture 70 is adapted to receive an adjustable stop screw 72 (see Figure 2) to engage the member 6 to determine the maximum turning angle of the driven wheel.

The member 7 has two annular flanges provided with flat surfaces forming the ends of the cylinder. The one surface 74 is parallel to the line of centers through the trunnion holes 47 and has a clearance notch or slot 75, the purpose of which will be evident hereinafter. The surface 74 may be suitably machined or apertured to take any desired kind of oil seal. In the embodiment shown in Figure 1 of the drawings, the surface 74 has a series of threaded apertures 76 for the insertion of screws 78. These screws 78 serve to clamp a boot-type of oil seal which consists of a boot-like member 79 of leather or other suitable flexible material formed in the shape of a frustum of a cone, the large diameter of which is clamped against the surface 74 by means of an annular sheet metal ring 80 placed on top of said boot and under the screws 78. The small end of the member 79 is clamped onto the reduced diameter portion of the inner socket member 6 by a clamping arrangement which consists of a circular sheet metal band 82 having centrally apertured ears 84 at its ends through which is inserted a suitable bolt 66. The bolt is adapted to draw ears 84 together, thus clamping the member 79 between socket member 6 and circular ring 82. The member 79 is sufficiently long from its base to its apex so that when the wheel is turned to its maximum angle, the ends of the member will not pull out from under either of its clamping members.

The flat surface 88 at the side of the socket member opposite surface 74 is at a slight angle to the line of centers through trunnion holes 47. This slight angle is provided for the purpose of giving the driven wheels the proper camber. Camber of the wheels is necessary to insure ease of steering. Studs 90 (see Figure 1) are inserted into threaded apertures provided therefor in annular surface 88 and together with nuts 91 are the means whereby the spindle 92, the brake-carrying plate 98 and the oil baffle 100 are removably secured to outer socket member 7.

The wheel spindle 92 is provided with a circular flange 101 having apertures spaced to correspond with the spacing of studs 90. The flange 101 is provided with an annular stepped portion 94 on one side thereof which is concentric with the spindle 92 and which fits snugly into the circular aperture in the flange of the outer socket member 7 bearing the flat surface 88. The stepped portion 94 of the flange 101 and the circular aperture in the end of the outer socket member 7 serve to concentrically position spindle 92.

On the opposite side of said circular flange 101 and of approximately the same diameter is a second annular concentric stepped portion 96 which pilots the circular brake-carrying plate 98. The circular oil baffle 100 carried by the studs 90 as described above is designed to trap any lubricant which may leak from the hub bearings. A slot 102 is provided in the lowermost portion of the circular flange 101 of the spindle 92 for the purpose of permitting any lubricant trapped by oil baffle 100, to drain out, thus preventing such trapped lubricant from getting into the brakes.

An annular stepped portion 104 of reduced diameter is provided on the same side of the circular flange 101 as annular stepped portion 96 and carries the hub bearing oil seal 106 of any suitable design. As shown on Figure 1 the seal may consist of a suitable sealing material clamped against the recess provided by the stepped portion 104 by means of a circular metal stamping of L section. The sleeve-like portion of spindle 92 extends outwardly from said circular flange 101 and is adapted to carry spaced wheel bearings 108 and 110. These wheel bearings are maintained in proper relation and adjustment by means of a suitable locking arrangement 112 which is threaded onto the threaded end portion of spindle 92. Carrying the inner end of universal joint shaft 18 and rigidly secured as by a press-fit to an internal surface provided therefor at the inner end of spindle 92 is a sleeve-like bearing member 107, preferably made of graphited bronze.

The outer races of bearings 108 and 110 are carried in spaced relationship in a suitable wheel hub 114. The hub 114 has an annular flange 115 at its outer end, one side of which has a stepped annular shoulder 116 which carries brake drum 117 and the other side of which is provided with a flat surface against which is clamped a suitable wheel disk 118. Brake drum 117 and wheel disk 118 are removably secured to the flange 115 by means of wheel studs 119 and nuts 120 and 121. Said wheel disk 118 is centrally apertured to receive an annular flange 122 of a drive connection member 124 which imparts driving power from the universal joint driven shaft 18 to the hub 114. Said member 124 has an inner hub extension which abuts the shoulder 22 and which is internally splined to snugly fit splines 20 of shaft portion 18. The internal splines of member 124 terminate at a point short of its outer end, thus forming an internal, interrupted shoulder. A clamping member 126 of lipped, cup section is inserted so that the lip of the cup section registers with the internal, interrupted shoulder and the bottom of the cup section abuts the end of shaft portion 18. The bottom of the cup section has a central aperture through which lubrication fitting 26 is inserted and against which said lubrication fitting is clamped.

From the description immediately foregoing it will be seen that the member 124 is firmly positioned on the shaft portion 18. The outer annular flange 122 of the member 124 as previously mentioned pilots wheel disk 118. Suitable apertures are provided in member 124 by means of which said member is positioned on studs 130 provided in hub 114 and whereby said member 124 and hub 114 are removably secured together.

It is to be understood that there is no novelty claimed for the particular design of wheel disk, hub or brakes per se. Any such wheel disk, hub or brakes which perform the desired functions and are of the desired dimensions, are acceptable.

The modification illustrated in Figure 6 is substantially identical with the form of invention shown in Figure 1 with the exception of certain differences that will be pointed out as the description thereof proceeds. Referring now to Figure 6 it will be seen that load-carrying member 1a has no outer flange and neither has inner universal joint socket member 6a. Said housing 1a and socket member 6a have extensions of the same relatively small diameters which are joined together at 134 as by butt-welding. The use of this or an equivalent construction which is made possible by my invention eliminates the accurate machining required for outer flanges of axle housing 1 and socket member 6 of Figure 1 and also eliminates the danger of the bolts which clamp said flanges together from loosening. There is also a reduction in weight. The elimination of the flanges and the use of the butt-welded joint is made feasible by the use of the one-piece outer universal joint socket member 7a.

Figure 7:
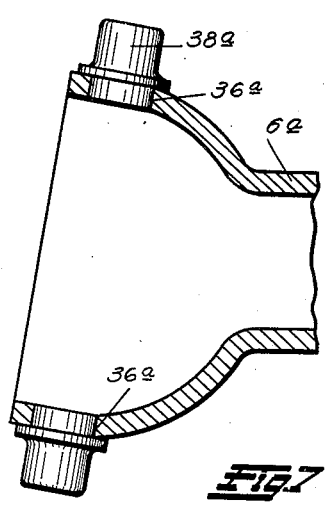
Figure 7 is a detail sectional view of the inner socket member of Figure 6.

When the inner socket member 6 is made with a flange (as illustrated in Figure 1) it is necessary that it be made from a forging or casting. Needless to say, such a method of making said member is very expensive. By eliminating the flange and making member 6a, as illustrated in Figure 7, it is possible to make it from a stamping. Such a method is extremely economical, not only from an initial manufacturing standpoint, but also due to the fact that the only machining required is the drilling of the trunnion holes 36a.

Another difference between the modification illustrated in Figure 6 and that shown in Figure 1 is that the centerline of the trunnions 38a is inclined at an angle to the vertical, bringing the centerline of the trunnions into or substantially into coincidence with the centerline of the wheel at the surface of the roadway. Such inclination is desirable to further facilitate steering of the vehicle. Preferably the centerline of the trunnions intersects the surface of the roadway a short distance inwardly from the point of contact of the wheel tire with the roadway. Such inclination requires that the steering arm 51a which is integral with upper trunnion cap 45a have a slight bend to compensate for said angle.

As is the case with outer socket member 7 of Figure 1, outer housing 7a has a flat surface 74a on the apertured wall thereof which is parallel to the line of centers through the trunnion bearing apertures 47a. In like manner the flat surface 88a on the opposite apertured wall is inclined slightly with respect to the vertical when the center-line of the trunnion bearing apertures 47a is in operative position. Bosses 62 and 48 are the same.

Figure 6 illustrates another method of sealing the lubricant within the universal joint, but it will be understood that a boot-like member similar to member 79 of Figure 1 may be used. In the modification of Figure 6, two circular metal stampings 136 and 138 are clamped against surface 74a by means of screws 78a. Metal stamping 138 is depressed at its inner portion so that a pocket 140 of substantially rectangular cross section is formed between the two stampings. A sealing material, such as felt or cork is inserted into said pocket 140 and rests against the outer spherical surface of inner socket member 6a. It is necessary with this seal that the outer spherical surface of member 6a have a reasonably smooth finish so that the sealing material will slide thereon.

Figure 10:
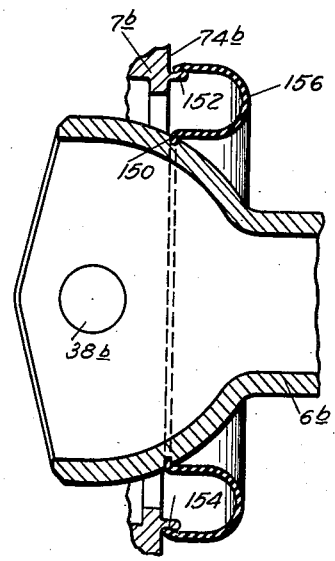
Figure 10 is a view similar to Figure 2 certain of the parts being omitted for the sake of clarity, and illustrates a further modification of this invention.
Figure 11:
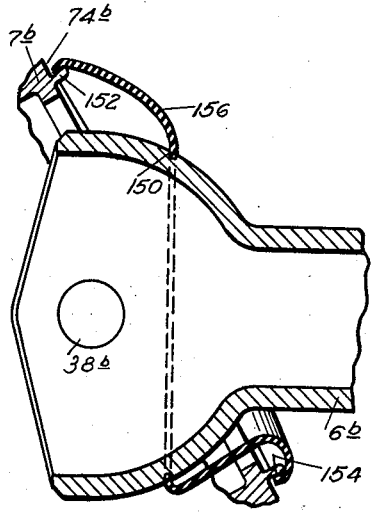
Figure 11 is a top plan view of the modification of Figure 10, showing the parts when the wheel is turned at an angle.

The modification illustrated in Figures 10 and 11 is substantially identical with that shown in Figure 1 or 6 with the exception of the means for sealing lubricant within the universal joint. In this modification, inner socket member 6b is provided with a circular groove 150, the plane of which is substantially parallel to the line of centers of the trunnions and is in close proximity thereto. Outer socket member 7b has an annular, upwardly-turned lip 152 extending outwardly from annular surface 74b, thereby forming an annular groove 154.

An annular sealing member 156 or sealing boot is placed so that its inner margin fits in groove 150 of inner socket member 6b and its outer margin fits in groove 154 of outer socket member 7b. The sealing member 156 is bulged sufficiently between its inner and outer margins so that when the steering wheel is turned to its maximum angle neither of the margins will pull out of their registering grooves. Figure 11 illustrates the shape assumed by the member 156 when the steering wheel is turned to its maximum angle. Sealing member 156 is made of a molded, resilient material, such as rubber, the margins thereof being molded to a lesser diameter than their respective registering grooves so that when assembled each of the margins will be stretched and thus create a tight fit in the grooves.

Figure 12:
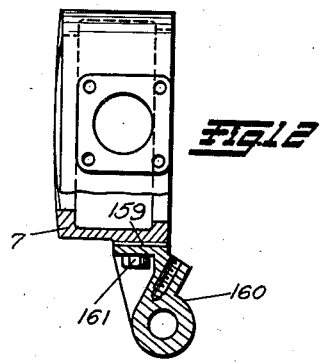
Figure 12 is a view similar to Figure 3 showing a slightly modified form of outer socket member.

Figure 12 illustrates a slightly modified construction of the outer socket member of the wheel mounting of this invention which is applicable to socket members 7, 7a or 7b shown in Figures 3, 8, and 10 respectively. The outer socket member 7 of Figure 12 is provided with a boss 159 having a finished surface against which the base of the removable arm 160 corresponding to part 66 and the boss 62 is clamped in a suitable manner as by cap screws 161 or equivalent fastening means. The flat surface of the boss 159 and the mating base of the arm 160 may be of any desired outline and these parts may be conveniently formed so that the mating surfaces thereof are rectangular, in which case the apertures in each, for the reception of screws 161 may be located at the corners of the rectangle.

To insure accurate alignment of arm 160 on the boss 159 a keyway may be provided on either of these parts with a corresponding key on the other part which will seat in the keyway, or other equivalent aligning means may be used. In this manner not only will accurate alignment of the parts be insured, but undesirable stresses will be removed from screws 161 as they will be relieved of an aligning function and need serve only as fastening means. As explained above, the boss 62 of member 7a may be made detachable in the manner just described.

The assembly and taking apart of the apparatus above described is exceedingly simple as compared to prior devices. All that is necessary in disassembling the parts is to remove the nuts on studs 130, thereby allowing the removal of driving connection member 124. Thereafter nuts 26, 112, 120 and 91 are removed to permit detachment of the wheel structure from the one-piece housing 7. The universal joint oil seal connection with the outer socket member is next disengaged and the bolts 52 holding trunnion caps 44 and 45 in place are removed, thereby permitting the removal of said caps together with bearings 42, outer races 43 and thrust washers 54. With the outer wheel structure and the caps thus removed, the one-piece housing 7 can be raised until the upper portion of upper trunnion 38 is disposed on a level with clearance slot 75 whereupon the housing member 7 can be tilted and withdrawn outwardly. The procedure is followed in taking apart the devices of either Figure 1 or Figure 6. The universal joint is thus exposed and servicing thereof may be performed. The reverse of the procedure just outlined may be followed in assembling the parts.

The advantages of this invention are evident from the above detailed description. By its use the number of bolted joints is reduced, the machining costs are reduced, the sizes of the parts are reduced with a consequent reduction in unsprung vehicle weight, the lubricant sealing means is improved at reduced cost and a compact and sturdy arrangement is obtained.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a steering wheel drive, a hollow stationary housing provided with diametrically opposite trunnions, a movable housing having diametrically opposite sockets provided with cups into which said trunnions extend, a bearing surrounding each trunnion and seated in said cup into which said trunnion extends, said bearings comprising a plurality of uncaged needle-like roller bearing elements in contact with said trunnions.

2. In a steering wheel drive, a hollow stationary housing provided with diametrically opposite trunnions, a movable one-piece housing having diametrically opposite sockets into which said trunnions extend, a readily removable member containing a trunnion bearing seated in each of said sockets, said movable one-piece housing member being constructed to permit its separation from said stationary housing member upon removal of said bearing containing members from said sockets.

3. In a steering wheel drive, a hollow stationary housing provided with diametrically opposite trunnions, a movable housing having diametrically opposite upper and lower sockets into which said trunnions extend, a cap detachably secured to said housing member over said upper bearing socket and having a bearing retaining portion seated in said socket, a like cap for said lower bearing socket, bearings for each of said trunnions comprising a plurality of circumferentially unconfined bearing elements fitted within said caps and in contact with the trunnions, means in each of said caps serving as thrust bearings for said trunnions, said movable housing being constructed to permit ready separation from said stationary housing upon removal of said cap members and the bearings contained therein.

4. In a steering wheel drive, a fixed housing part, a movable housing part mounted to said fixed housing part by a pivotal connection including aligned trunnions, said movable housing part having a surface inclined with respect to the axis of said trunnions, a wheel carrying spindle and a drive wheel and means on said spindle for connection to said movable housing against said inclined surface whereby to provide the desired camber or inclination of said wheel.

5. In a steering wheel drive, a fixed housing part, a movable housing part mounted to said fixed housing part by a pivotal connection, a wheel carrying spindle and a drive wheel, said spindle having a surface perpendicular to its axis, said movable housing part having a surface inclined from the vertical and adapted for connection to said surface of the wheel carrying spindle whereby said wheel is inclined with respect to the roadway to provide the desired camber or inclination thereof.

6. In a steering wheel drive, a fixed housing part, a movable housing part mounted to said fixed housing part by a pivotal connection including aligned trunnions, the axis of said trunnions being inclined from the vertical, said movable housing part having a surface oppositely inclined with respect to the inclination of said trunnions, a wheel carrying spindle and a drive wheel, and means on said spindle for connection to said movable housing against said inclined surface whereby to provide the desired camber or inclination of said wheel.

7. A universal joint housing for a steering drive axle of the type including a stationary load carrying axle comprising a stationary housing member having a sleeve like portion and an enlarged housing portion, oppositely disposed trunnions formed separately from and permanently mounted on said housing portion, a one-piece housing member of generally cylindrical form surrounding said enlarged portion and detachably carried by said trunnions and having a lateral opening permitting it to be removable from said stationary housing toward the side opposite said sleeve like portion while said trunnions are in position, whereby the sleeve like portion of said stationary housing member may be integrally united to said stationary axle to form an integral part thereof, and sealing means detachably connected to said removable housing member to close said lateral opening.

8. In a steering wheel drive embodying a universal joint, a pair of nested housing members designed to enclose said universal joint and permit dirigibility, one of said housing members rigidly carrying a pair of diametrically opposed trunnions intended to form a permanent part thereof, the other of said members having a continuous one-piece wall portion affording diametrically opposed openings adapted to receive said trunnions, a cup and trunnion bearing assembly fitted in each opening and detachably secured to said one-piece wall, and said housing members being so shaped and constructed that, in assembling or disassembling them, they may be moved relatively in a direction axially of the trunnions after removal of only said cup and bearing assemblies and then relatively tilted to swing one of the trunnions into or out of one of said openings.

9. In a steering wheel drive embodying a universal joint, a pair of nested housing members designed to enclose said universal joint and permit dirigibility, one of said housing members having a pair of diametrically opposed trunnions, the other of said members having diametrically opposed openings adapted to receive said trunnions, a pair of cap structures closing said openings and affording thrust bearing abutments for the adjacent ends of said trunnions, said housing members having a material vertical clearance between them permitting one to be shifted relative to the other in a direction axially of the trunnions when said caps are not in position, and said members further being shaped to permit them to be joined or separated after said relative shifting movement, while said trunnions are in position.

10. In a steering wheel drive embodying a universal joint, a pair of nested housing members designed to enclose said universal joint and permit dirigibility, one of said housing members being provided with diametrically opposite trunnions, the other of said housing members being provided with diametrically opposed cups of relatively small diameter and into which said trunnions extend, the bottom of at least one of said cups affording a bearing abutment taking the vertical thrust load at an end of one of said trunnions, and a bearing comprising a plurality of rollers surrounding each trunnion and seated in the corresponding cup, said rollers being needle-like, as permitted by said bearing abutment and to permit said cups to be of minimum diameter.

11. In a steering wheel drive embodying a universal joint, a housing closely surrounding said joint, said housing comprising overlapped complemental inner and outer members, each of one-piece construction and shaped to permit separation; and a pivotal interconnection between said members including a trunnion carried by the inner member, an integral portion of the outer member having a cylindrical opening, a bearing socket detachably secured to said portion of the outer member and projecting substantially vertically through said opening and beyond said portion in the direction of said trunnion to surround said trunnion, and a plurality of needle-like roller bearing elements of substantially the length of said socket and surrounding said trunnion within said socket.

12. In a steering wheel drive embodying a universal joint, a housing around said joint, said housing comprising complemental one-piece inner and outer members, a trunnion mounted on the inner member and the outer member having a relatively short opening into which said trunnion extends, a combined bearing mounting and steering cap secured to said outer member and projecting inwardly through and beyond said opening to form a socket surrounding said trunnion, and a cageless roller bearing assembly disposed entirely within said socket in surrounding relationship to said trunnion.

13. A steering drive axle construction comprising a load carrying axle housing terminating at its outer end in a rigid and integral flaring portion, trunnions permanently provided on said flaring portion, and a wheel carrying structure designed to be pivotally connected to said trunnions, said structure comprising a housing member having a portion of one-piece formation surrounding said flaring portion, said one-piece formation having openings complete within itself for reception of said trunnions, the inner side of said housing member being shaped to permit it to be assembled inwardly from the end of the axle to bring said openings into surrounding relationship to the trunnions.

HERBERT W. ALDEN.